C. D. CURRY.

FEEDING MECHANISM FOR PAPER ASSOCIATING MACHINES.

APPLICATION FILED JAN. 15, 1913.

Reissued Mar. 30, 1915.

13,895.

5 SHEETS—SHEET 1.

WITNESSES

E. E. Nottingham

G. F. Downing

INVENTOR

C. D. Curry

By H. A. Seymour

Attorney

C. D. CURRY.

FEEDING MECHANISM FOR PAPER ASSOCIATING MACHINES.

APPLICATION FILED JAN. 15, 1913.

Reissued Mar. 30, 1915.

13,895.

5 SHEETS—SHEET 2.

WITNESSES

E. L. Nottingham

G. F. Downing.

INVENTOR

C. D. Curry

By H. A. Seymour

Attorney

C. D. CURRY.

FEEDING MECHANISM FOR PAPER ASSOCIATING MACHINES.

APPLICATION FILED JAN. 15, 1913.

Reissued Mar. 30, 1915.

13,895.

5 SHEETS—SHEET 3.

WITNESSES

E. Nottingham

G. F. Downing

INVENTOR

C. D. Curry

By H. A. Seymour

Attorney

C. D. CURRY.

FEEDING MECHANISM FOR PAPER ASSOCIATING MACHINES.

APPLICATION FILED JAN. 15, 1913.

Reissued Mar. 30, 1915.

13,895.

5 SHEETS—SHEET 4.

WITNESSES

E. Nottingham

G. F. Downing

INVENTOR

C. D. Curry

By H. A. Seymour

Attorney

C. D. CURRY.

FEEDING MECHANISM FOR PAPER ASSOCIATING MACHINES.

APPLICATION FILED JAN. 15, 1913.

Reissued Mar. 30, 1915.

13,895.

5 SHEETS—SHEET 5.

WITNESSES

E. D. Nottingham

G. F. Downing

INVENTOR

C. D. Curry

By H. A. Seymour

Attorney

UNITED STATES PATENT OFFICE.

CLAUD D. CURRY, OF BROOKLYN, NEW YORK, ASSIGNOR OF TWO-THIRDS TO AMERICAN ASSEMBLING MACHINE COMPANY, A CORPORATION OF TENNESSEE.

FEEDING MECHANISM FOR PAPER-ASSOCIATING MACHINES.

13,895. Specification of Reissued Letters Patent. Reissued Mar. 30, 1915.

Original No. 982,039, dated January 17, 1911. Serial No. 541,397. Application for reissue filed January 15, 1913. Serial No. 742,287.

*To all whom it may concern:*

Be it known that I, CLAUD D. CURRY, of Brooklyn, in the county of Kings and State of New York, have invented certain new and useful Improvements in Feeding Mechanism for Paper-Associating Machines; and I do hereby declare the following to be a full, clear, and exact description of the invention, such as will enable others skilled in the art to which it appertains to make and use the same.

This invention relates to improvements in paper associating or stuffing machines, and more particularly to improved feeding mechanism therefor,—the object of the invention being to provide simple and efficient means for feeding paper sections successively from different hoppers or sources of supply to mechanism which performs the work of "stuffing" or inserting one paper section within another.

With this object in view, the invention consists in certain novel features of construction and combinations of parts as hereinafter set forth and pointed out in the claims.

Figure 1:
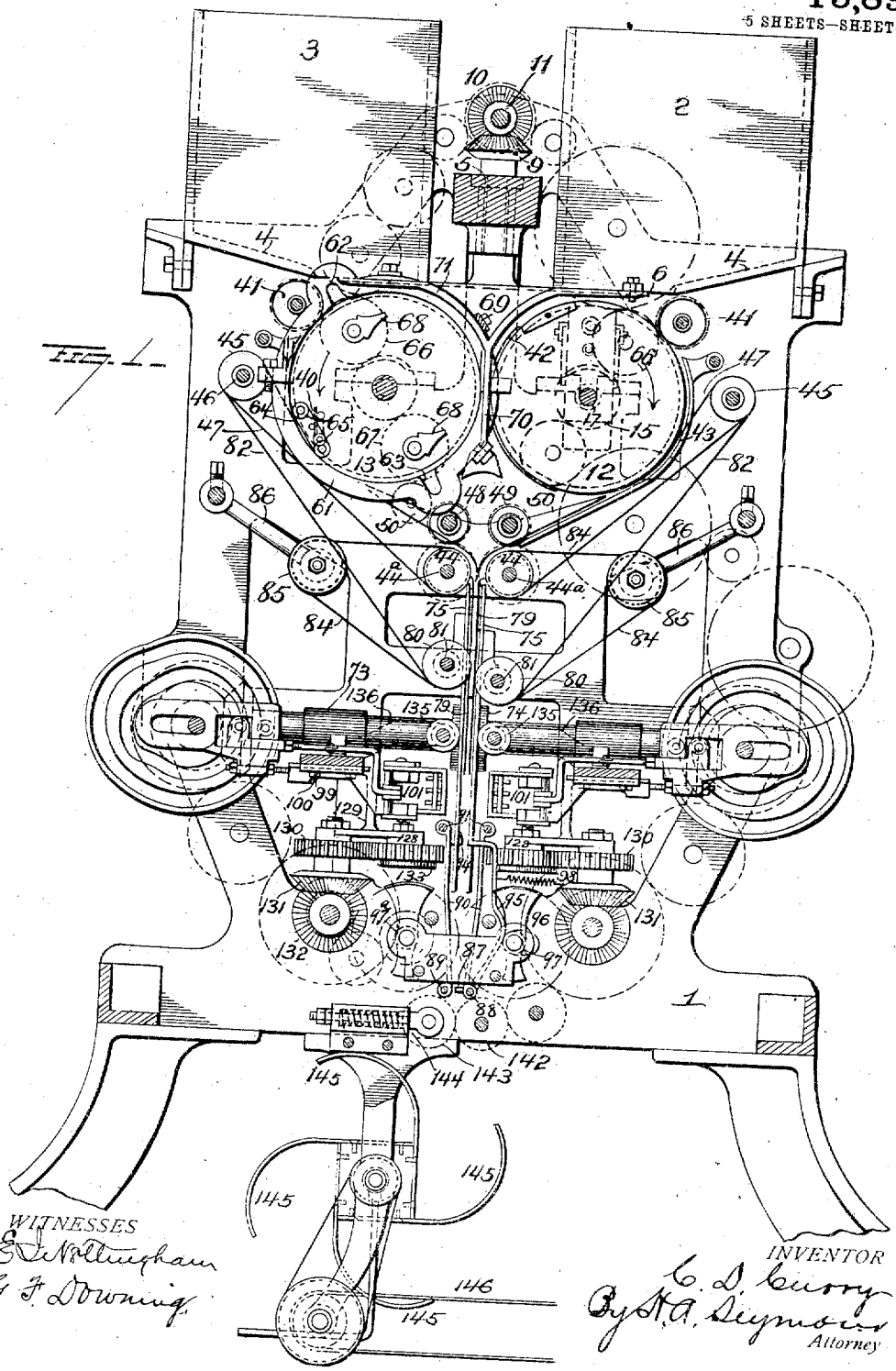
Figure 2:
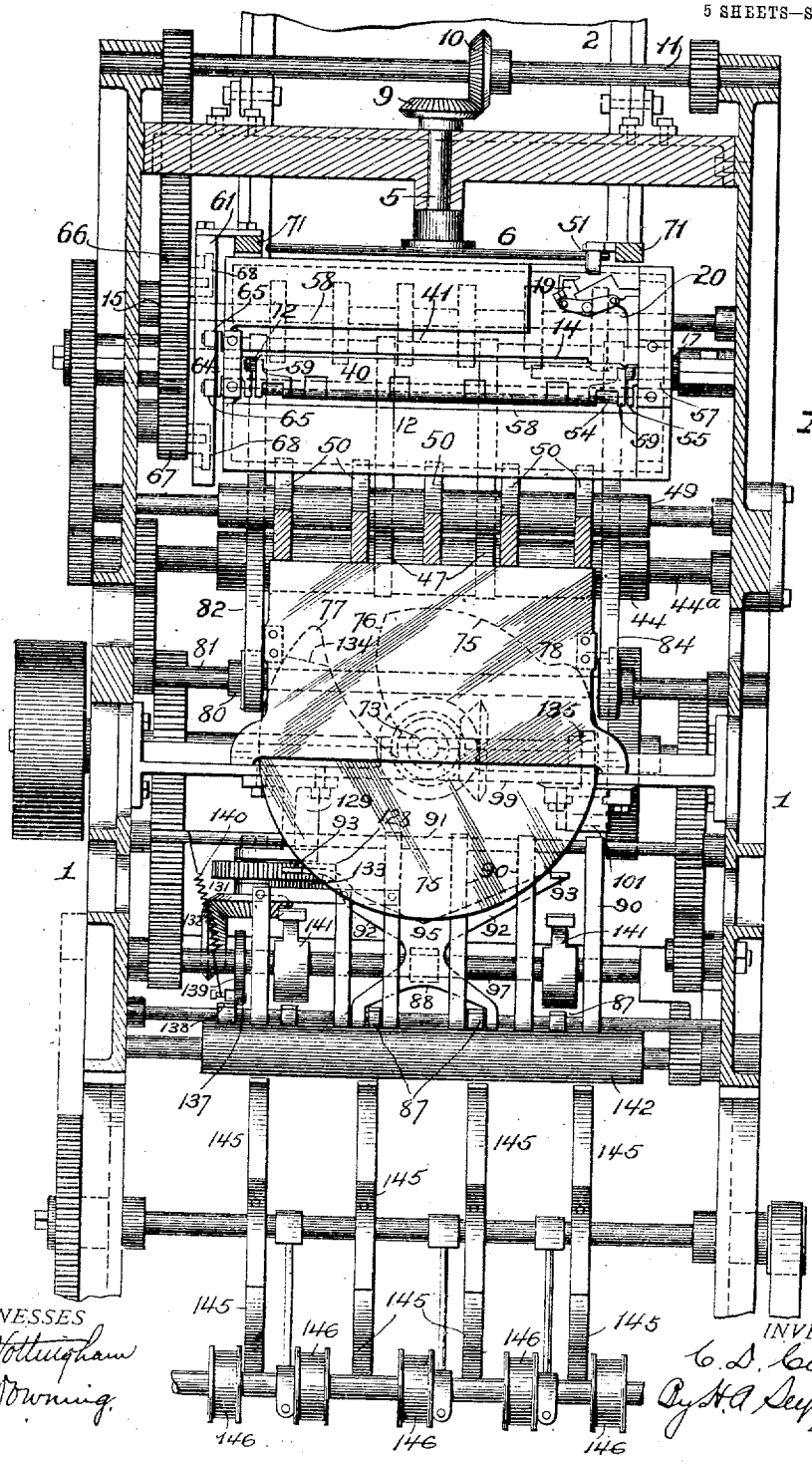
Figure 3:
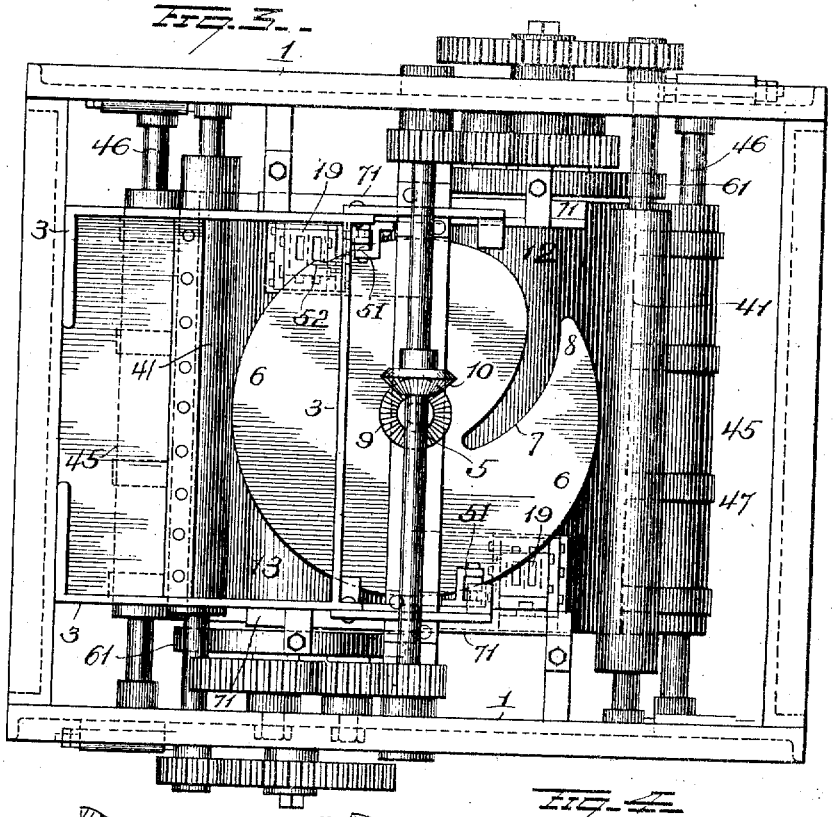
Figure 4:
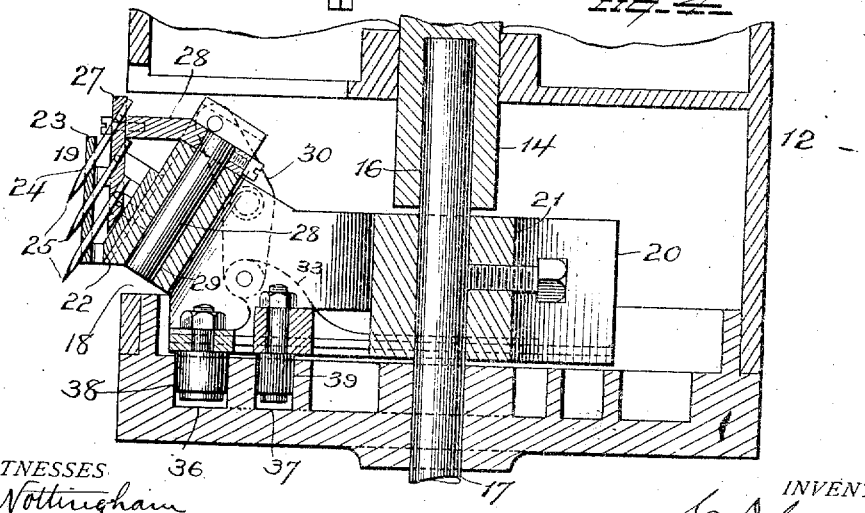
Figure 5:
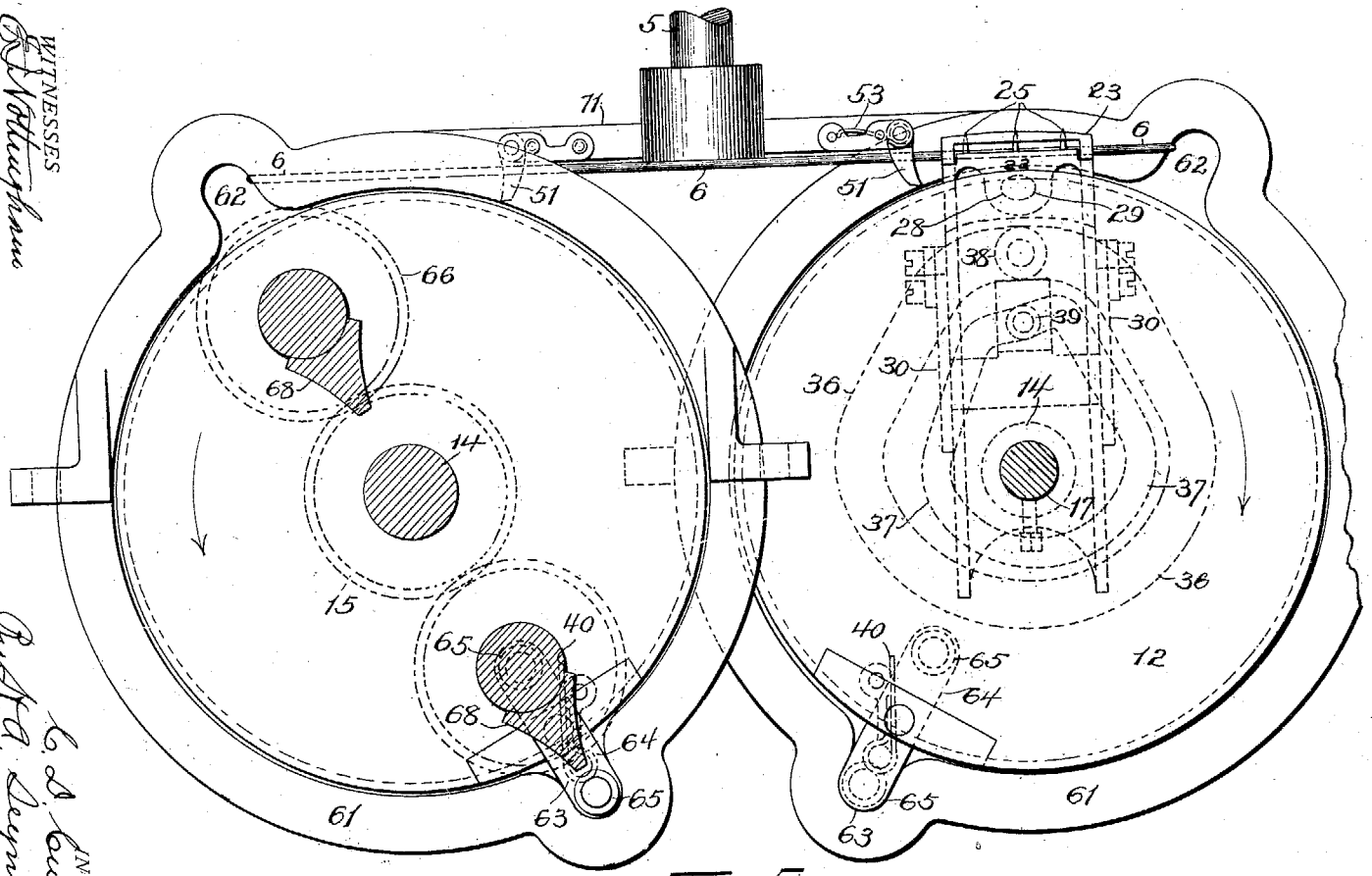
Figure 6:
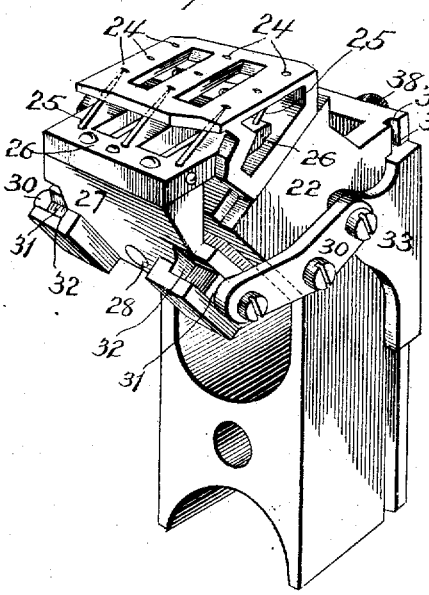
Figure 8:
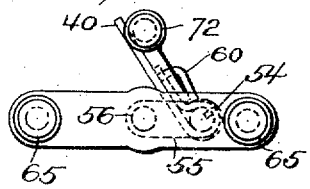
Figure 9:
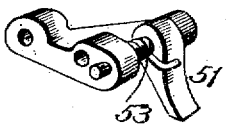
Figure 7:
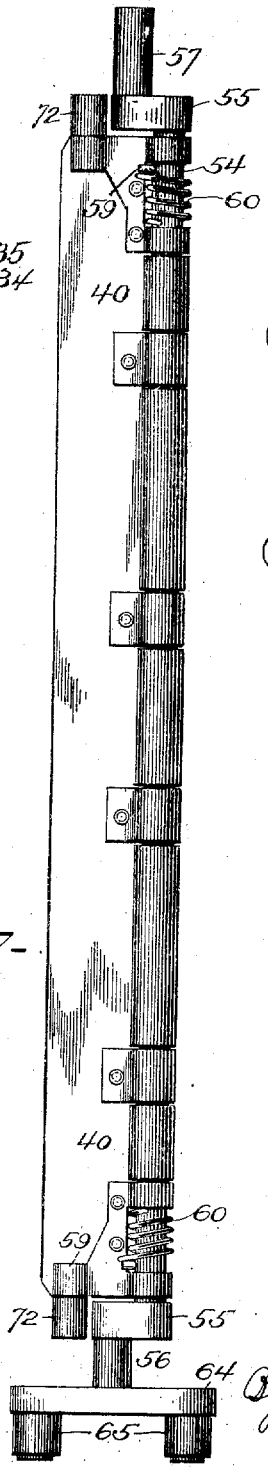

In the accompanying drawings; Figure 1 is a vertical transverse section, partly in elevation of a machine showing an embodiment of my invention; Fig. 2 is a transverrse vertical section through the center of the machine, at right angles to Fig. 1; Fig. 3 is a plan view with the hoppers removed. Fig. 4 is an enlarged sectional view of a portion of one of the cylinders and needle box devices; Fig. 5 is an enlarged end view showing the cylinders and coöperating devices; Fig. 6 is a perspective view of one of the needle box constructions employed in the cylinders of the feeding mechanism; Fig. 7 is a plan view of one of the tumbling blades; Fig. 8 is an end view of the same; and Fig. 9 is a perspective view showing one of the spring actuated fingers.

1 represents suitable frame-work, upon which two hoppers 2, 3 are located and these hoppers are provided with inclined bottoms 4 which extend partially across the lower ends of the same and terminate appreciable distances from the inner side walls of the hoppers. A vertical shaft 5 is mounted in the framework between the hoppers 2—3 and at its lower end, carries a horizontally-disposed disk 6 which projects partially across the open lower ends of both hoppers. This disk is made with a curved tapering slot or recess 7 extending inwardly from its peripheral portion and forming a tapering finger 8. The upper end of the shaft 5 is provided with a bevel gear 9 which receives motion from a bevel gear 10 on a horizontal shaft 11, for continuously driving the disk 6. Below the disk 6 and at respective sides of the axis thereof, horizontally-disposed cylinders 12 and 13 are located. Each cylinder is provided with a shaft 14, one end of which projects beyond the cylinder and forms a journal mounted in a suitable bearing in the frame-work, and to the journal of each shaft 14, a gear 15 is secured to receive motion from the driving mechanism. The inner end of the shaft 14 of each cylinder terminates within the latter and is made with a socket 16 which receives the inner end of a short shaft 17 secured to the framework. The shaft 14 of each cylinder is thus journaled at one end in a bearing on the framework and at the other end, on the inner end of the fixed shaft 17.

It may be here stated that the mechanisms at respective sides of the vertical center of the machine, are duplicates in construction and mode of operation, but the two sets of devices are arranged in reverse positions at respective sides of the vertical center of the machine.

Each cylinder 12—13, is provided in its peripheral wall near one end, with an opening 18 for the accommodation of a mechanical withdrawing device or needle box 19 as shown in Fig. 1. In constructing this withdrawing device or needle box, I provide a rectangular frame 20 which embraces and slides on a block 21 secured to the fixed shaft section 17 so as to be guided in its longitudinal movements by said block. The frame 20 is provided at one end with an inclined enlargement 22, the outer face of which is disposed at an angle of approximately 45° to the axis of the frame 20. To the inclined face of the enlargement 22, a skeleton head 23 is adjustably secured. The outer member of the skeleton head 23 is disposed at right angles to the axis of the frame 20 and is provided with a number of inclined perforations 24 for the passage of a number of pins or needles 25, projecting in an inclined direction from a series of fingers 26, which constitute the upper or outer members of a movable head 27. A guide rod 28 projects from the lower or inner portion of the movable head 27 and moves freely in a socket 29 in the enlargement 22 of the frame 20. Levers 30 are pivotally supported between their ends, at diametrically opposite portions on the frame 20. The inwardly projecting arms of the levers carry pivotal blocks 31 mounted to move in ways 32 at the inner end of the movable head 27, and the outwardly projecting arms of said levers are pivotally attached to a cross head 33 mounted on the frame 20 and provided with ribs 34 to move in guide grooves 35 in said frame. It is apparent that if the cross head 33 be moved on the frame 20, motion will be imparted, through the medium of the levers 30 to the movable head 27 for the purpose of projecting or withdrawing the pins or needles 25. For thus operating the cross head and for sliding the frame 20 longitudinally, each cylinder (12 and 13) is provided at one end with two cam grooves 36 and 37, one within the other. A pin 38 projecting from the sliding frame 20 enters the larger outer cam groove 36 and a pin 39 projecting from the cross-head 33 coöperates with the inner cam groove 37.

As shown in Fig. 3 of the drawing the needle box, or withdrawing devices 19 above described, are located at one end of the cylinder 12 and at the opposite end of the cylinder 13. Hinged fingers 51 are located near the needle boxes or withdrawing devices 19 and are held up in engagement with the bottom paper sections in the hoppers, by the peripheral portions of the disks 6. It will be observed in Fig. 3 of the drawing, that the peripheral portion of the disk 6 is depressed from the point 52 to the slotted portion of said disk. When, during the rotation of the disk, the depressed portion 52 reaches the finger 51, the latter will be free to drop and it will be positively forced down by the action of a spring 53, so as to be out of the way of the needle box or withdrawing device 19.

The cams 36 are so formed that they will cause the needle box 19 to be projected toward the lower ends of the hoppers 2—3 and subsequently withdraw them, and the cams 37 will also coöperate with the cross heads 33 as to cause the needles 25 to be projected and afterward withdrawn. The cams 36—37 of the respective cylinders are so disposed that the needle boxes or withdrawing devices in one cylinder (say the cylinder 12) will operate in advance of those in the other cylinder, so that an outer "part" or "section" of sheets will be withdrawn from one hopper in advance of the withdrawal of an inner "part" or "section" from the other hopper. Thus the needle box in one end of the cylinder 12 will be projected upwardly toward the folded section of papers lying in the bottom of the hopper 2 and the needles 25 of this needle box will be thrust upwardly in an inclined direction as previously explained, and caused to engage the bottom folded paper section. As the cylinder and its cams continue to turn, the needle box will be caused to retreat and thus to pull the corner of the folded paper section downwardly into the slot 7 of the horizontal disk 6. The cam 37 in the cylinder will afterward operate to withdraw the needles 25 from the paper section. The rotation of the disk 6 will first cause its finger 8 to pass over the paper section, and during the rotation of the disk, a portion thereof will become disposed over a portion of the folded paper section. As the disk 6 turns, its finger portion 8 will engage the finger 51 which had been dropped and raise said finger to its normal horizontal position. During such raising of the finger 51, any portion of a superimposed paper section which may have descended with the lowermost paper section being fed from the hopper, will be raised and its entanglement with the disk 6 effectually prevented. The paper section having been partially removed from the hopper, will now be met by a tumbling blade 40 carried by the cylinder and deflected by said blade so as to be fed between the cylinder and a feed roller 41. The cylinder is provided with shoes 42 of leather or other suitable material, which are so placed that they will arrive approximately opposite the feed roller 41 after the paper section reaches the latter.

The coöperation of the shoes 42 on the cylinder with the feed roller 41, will cause the paper section to be fed downwardly and said paper section will be made to follow the cylinder by means of curved guides 43. After conforming to the contour of the cylinder throughout a portion of their length, the guides 43 project downwardly in a straight diagonal direction and terminate adjacent to rollers 44 secured to a shaft 44ª located at one side of the vertical axis of the machine. Rollers 44 are similarly located at the other side of the vertical axis of the machine and the guides 43 and feed roller 41 are also duplicated so as to coöperate in the same manner as above described with the cylinder 13 and the paper sections removed in the same manner as previously explained from the hopper 3. Rollers 45 are located on shafts 46 adjacent to the cylinders 12 and 13. Feeding tapes 47, coöperating with the respective cylinders 12 and 13, pass over the rollers 44 and 45 at respective sides of the vertical axis of the machine and are driven by power applied to the shafts of the rollers 44. Shafts 48 are located above the rollers 44 and carry rollers 49, which cooperate with the tapes 47 to feed the paper section downwardly over the rollers 44. Guides 50 are hung on the shafts 48 and extend from the longitudinal center of the machine approximately to the cylinders 12 and 13, so as to cooperate with the tapes in directing the paper sections downwardly between the rollers 44.

Reverting now to the tumbling blade 40, its construction and mode of operation will be explained: Each cylinder (12 and 13) is provided with an elongated slot or opening 58 behind which a shaft 54 is located and provided with crank arms 55, having journals 56—57 mounted in the respective heads of the cylinder. On the shaft 54, the blade 40 is hinged and pressed in one direction against stops 59 on the shaft, by means of springs 60. It will be understood that each cylinder is provided with a tumbling blade and are duplicates in construction and mode of operation. Near one end of each cylinder, a ring 61 is located and provided at diametrically oposite points with recesses 62—63. A cross head 64 is located at the end of the journal 56 of each shaft 54 and from the respective ends of this cross head, pins 65 project into the ring 61. Gears 66—67 are mounted on suitable studs on the framework adjacent to the ring 61, and each of said gears is provided with a lug 68 disposed within said ring 61. T-shaped trackways 69 are located adjacent to the respective ends of the cylinders, and each comprises a vertical portion 70 located between the cylinders and lateral portion 71 projecting upwardly over the cylinders. With these trackways, rollers 72 at respective ends of the tumbling blades 40 coöperate as presently explained. During the passage of the tumbling blade 40 under the disk 6, it will be prevented from engagement with the latter, by the engagement of the rollers 72 with the upper members 71 of the trackway 69. When the blade, moving with cylinder, deflects the paper section and causes it to be fed under the feed roller 41 as previously explained, one of the lugs 63 will engage one of the pins 65 on the shaft 54 and force the same into one of the recesses (62 or 63) in the ring 61. As the cylinder continues to turn, the engagement of one of the pins on the shaft 54 with the recess in the ring 61 will cause the shaft 54 and the blade 40 to be turned over. When, during the rotation of the cylinder, the tumbling blade reaches the other recess in the ring 61, one of the pins 65 will enter the other recess (62 or 63), and the blade will again turn so as to place it in proper position to deflect the next paper section coming from the hopper. After the blade 40 has been thus turned, it will be prevented from engagement with the adjacent cylinder by the riding of the pins or rollers 72 on the vertical portion 70 of the trackway 69,—the blade being thus pressed back against the resistance of the spring 60.

I have hereinbefore described the construction and operation of the mechanism which will take a folded paper section from the bottom of a hopper and deliver the same, with the folded edge at the bottom, at the rollers 44. The mechanisms for the duplicate sets are so timed that after an outer paper section has been fed from one hopper downwardly past the rollers 44, the inner paper section will be fed in the same manner and made to follow the first-fed section,—the purpose being to insert the said inner paper section into the outer paper section. Before the inner paper section can be inserted into the outer section, the latter must be opened to receive it, and after the paper sections shall have been "stuffed", they must be discharged from the machine. For these purposes, the mechanism now to be described will be employed.

Some distance below the rollers 44, two shafts 73 are mounted in the framework and terminate at their inner ends at respective sides of the vertical center of the machine. These shafts are provided at their inner ends with annular flanges 74 to which vertically disposed disks 75 are secured, each of said disks being made with a curved slot forming a finger 77, and with a depressed peripheral portion 78, for a purpose hereinafter explained. Parallel guide plates 79 are suitably supported by the framework and extend from the rollers 44, downwardly between the disks 75,—said guide plates terminating at their lower ends somewhat below the axes of the disks 75. Rollers 80 are mounted near the shafts 81 located in proximity to the guide plates 79. Tapes 82 pass over rollers 45 near one end of each shaft 46 and, extending downwardly parallel with the tapes 47, pass over rollers 44 on the shafts 44ª; then downwardly and under the rollers 80, and finally back to the rollers 45 on shafts 46. Tapes 84 pass over rollers at one end of each shaft 44ª, and over rollers at one end of each shaft 81,—said tapes 84 also passing over rollers 85 supported by brackets 86 secured to the framework.

A paper section is fed downwardly by the action of the tapes above described and after passing between and beyond the lower ends of the guide plates 79, will rest on fingers 87 projecting from a shaft 88 located below the vertical disks 75. Adjacent to the shaft 88, another shaft 89 is located, and to the shafts 88 and 89, the lower ends of guide strips 90 are secured, the upper ends of said strips being supported by transverse rods 91 located short distances outwardly from the outer faces of the disks 75.

In order to prevent the paper section from collapsing or crowding upon itself by dropping too heavily upon the fingers 87, I provide arms 92 pivotally supported at the lower end on the shaft 88 and provided at their upper ends with fingers 93 adapted to coöperate with stops 94 supported by one of the rods 91. The arms 92 are provided with a shoulder 95 to be engaged by a cam 96 on a shaft 97. The gearing which operates the shaft 97 is so turned that the cam 96 will force the arms 92 toward the stops 94 and catch the descending paper section before the latter reaches the fingers 87, and as the cam 96 passes the shoulder 95, the arms will be retracted by a spring 98 so as to release the paper section and permit it to drop lightly upon the fingers 87.

Transverse bars or brackets 99 are fixed to the framework some distance laterally from the disks 75 and these bars or brackets are provided with guides 99ª (Fig. 2) which support longitudinally movable arms 100 carrying needle boxes 101 at their inner ends. These needle boxes are located near the front of the machine in proximity to the disks 75 and the depressed peripheral portions of these disks will permit said needle boxes to reach the upper front corners of a paper section resting between the disks.

The mechanism for operating the needle boxes 101 is so timed and proportioned that the two needle boxes will be simultaneously moved toward each other and caused to confine the corner of the folded paper section between them,—after which the needles will be projected and made to engage the paper section. In order to insure such engagement of the needles with the paper section so that when the needle boxes are withdrawn, the corners of the folded paper section will be moved laterally, the devices now to be described will be employed. The journal bearings of gears 128 are supported by brackets 129 secured to the framework and receive motion from gears 130, the shafts of the latter being provided with bevel gears 131 to receive motion from bevel gears 132. The gears 128 are provided with projections 133 which coöperate to grasp the paper section and pull the same laterally with sufficient force to cause the inclined needles to properly peneterate the paper.

Each disk 75 is made with a shoulder 134 (Fig. 2) near the free end of the finger 77 and in the paths of these shoulders, rollers 135 (Fig. 1) are disposed,—said rollers being carried at the free inner ends of arms 136 secured to the fixed transverse bars 99. The paper section having been disposed between the disks 75 and made to rest with its folded lower edge upon the fingers 87, the needle boxes 101 will advance to grasp the corner of the paper section between them and the needles caused to peneterate the members of the folded paper section, all as previously explained. The needle boxes will now be retracted to cause the corners of the members of the paper section to separate from each other, and afterward, the needles will be withdrawn from the paper. When the corners of the folded members of the paper section shall have been moved away from each other, the nose or finger portions 77 of the disk 75 will approach the separated corners of the paper section members and, as the shoulders 134 on said fingers 77 pass over the rollers 135, said fingers will be depressed sufficiently to cause them to enter between the members of the folded paper section. Now as the disks continue to rotate, they will become disposed on the inside of or between the members of the folded paper section, and thus said paper section will be opened out and, supported by the guide strips 90, be in position to receive an inner paper section between its members.

When the operations on an outer paper section coming from one of the hoppers, shall have been completed, an inner paper section or "insert" will arrive between the guide plates 79 and will drop down between the disks and therefore into the opened-out outer paper section. The "stuffed" paper sections are now resting upon the fingers 87 and these fingers are maintained in a horizontal position to sustain the paper section or sections during the operations above described, by the engagement of a roller 137 (Fig. 2) on an arm 138 secured to shaft 88, with a cam 139 on the shaft 97. When the stuffing operation shall have been completed, the cam 139 on the shaft 97 will have moved to a position to release the arm 138 on shaft 88, when a spring 140 attached to said arm 138 will cause the shaft 88 to turn and the fingers 87 carried by this shaft, to descend and thus remove the support for the stuffed paper sections. Opposite the shaft 97, another shaft 97ª is located, and these shafts 97 and 97ª carry clutch arms or jaws 141. The shafts 97 and 97ª are geared to rotate in opposite directions, so that the arms or jaws 141 moving toward each other, will coöperate to grasp the stuffed paper sections and move the same downwardly between positively-driven feed rollers 142, 143, the latter being supported by a spring-pressed or yielding bracket 144. The stuffed paper sections are fed by the rollers 142, 143 to one of a series of rotating delivery fingers 145, by means of which latter, the paper is placed upon a traveling conveyer 146 which will carry the same from the machine.

The gearing by means of which the various parts of the mechanism are driven, is shown diagrammatically in Fig. 1 of the drawing, power being applied to one of the shafts 115.

While my improvements are designed for "stuffing" newspapers they may be employed also for assembling papers of a different character, such for example, as signatures for books or magazines.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a machine of the character described, the combination of a hopper for superimposed paper sections devoid of bodily movement while the lowermost section is deflected therefrom, feeding means beneath said hopper for bodily and reversely withdrawing a paper section from the hopper, and means also beneath said hopper for downwardly deflecting the leading end of the paper section without disturbing the bodily relation between the said paper section and the superimposed pile and for uninterruptedly presenting said paper section with the leading edge reversed to the feeding means aforesaid.

2. In a machine of the character described, the combination of a hopper for superimposed paper sections, a frictional feeding member beneath said hopper, a frictional feeding surface adapted to coöperate with the frictional feeding member, means for downwardly deflecting the leading end of the paper section from the hopper without disturbing the bodily relation between said paper section and the superimposed pile, and a reversing member for engaging the upper surface of the said deflected leading end for uninterruptedly reversing the leading edge of said section and presenting it to the coaction of the frictional member and surface, whereby the paper is bodily removed from the hopper in inverted position with its leading edge reversed.

3. In a machine of the character described, the combination of a hopper for superimposed paper sections, means for partially deflecting the leading end of the lowermost paper section in the hopper downwardly without disturbing the bodily relation between said paper section and the superimposed pile, means for uninterruptedly reversing the partially deflected leading end of the paper section, and means for bodily removing the paper section from the hopper.

4. In a machine of the character described, the combination of a hopper for superimposed paper sections, means for partially deflecting the leading end of the lowermost paper section in the hopper downwardly without disturbing the bodily relation between the said paper section and the superimposed pile, means for uninterruptedly engaging the upper surface of the deflected leading end of the paper section thereby reversing its position, and means for bodily removing the entire paper section from the hopper.

5. In a machine of the character described, the combination with a support for paper sections, and a revoluble disk disposed below the same and having a slot forming a finger, of a vertically movable needle box located below the disk and movable past the same to engage a paper section on the support, said needle box comprising relatively movable members and needles carried by one of said members, operating means for the members of the needle box, and means for rotating the disk.

6. In a machine of the character described, the combination with a support for paper sections, of a revoluble disk having a slotted portion forming a finger, and a depressed peripheral portion, a finger normally sustaining a portion of a paper section and held in position by the disk throughout a portion of the rotation of the latter, a spring for depressing said finger into the path of the finger of the disk when released at the depressed peripheral portion of the disk whereby the finger of the disk will raise the spring-actuated finger to normal position.

7. In a machine of the character described, the combination with supporting means for paper sections, of a horizontally disposed revoluble disk having a slotted portion forming a finger, means for withdrawing the corner of a paper section in position to enter the slot of the disk, and means controlled by the disk for moving portions of a superimposed paper section out of the path of the disk.

8. In a machine of the character described, the combination with a support for paper sections, of a cylinder below the same, a feed roller coöperating with said cylinder, means located in said cylinder for withdrawing a portion of a paper section, other means for feeding the partially withdrawn paper section from the support to the cylinder, and means carried by the cylinder for presenting the paper section edgewise between said cylinder and feed roller.

9. In a machine of the character described, the combination with a support for paper sections, of a cylinder below said support, a feed roller coöperating with said cylinder, means for removing a paper section from the support, and a tumbling blade carried by the cylinder for presenting a paper section edgewise between the cylinder and feed roller.

10. In a machine of the character described, the combination with a support for superimposed paper sections devoid of bodily movement while the lowermost section is deflected therefrom, of deflecting devices disposed below said support, means for operating said devices to engage a paper section near the leading end thereof, and downwardly deflecting such leading end portion without disturbing the bodily relation between the said paper section and the superimposed pile, and other means located below said support operating to bodily remove the partially deflected section from the support and simultaneously reverse the same uninterruptedly and feed it forwardly.

11. In a machine of the character described, the combination with a support for paper sections, of a cylinder mounted below said support, a feed roller coöperating with said cylinder, a horizontally disposed disk over the cylinder and having a slotted portion, means for presenting a portion of a paper section to said disk, and a tumbling blade carried by said cylinder.

12. In a machine of the character described, the combination with a support for paper sections, a cylinder below said support, and a feed roller coöperating with said cylinder, of a disk having a slotted portion, horizontally disposed over said cylinder, means in the cylinder to withdraw a portion of a paper section and present it to the slotted portion of the disk, and a tumbling blade carried by the cylinder for presenting a paper section edgewise between the cylinder and feed roller.

13. In a machine of the character described, the combination with a support for paper sections, and a slotted revoluble disk disposed horizontally to receive paper sections from said support, of a cylinder disposed below the disk and provided with heads, a feed roller coöperating with said cylinder, a shaft having crank arms mounted in the cylinder heads, a spring pressed blade mounted on said shaft, a cross head on one of the journals of said shaft, pins on said cross head, and a fixed ring having recesses coöperating with said pins and means for tumbling the blade.

14. In a machine of the character described, the combination with a support for paper sections, and a slotted revoluble disk disposed horizontally to receive paper sections from said support, of a cylinder disposed below said disk, a feed roller coöperating with said cylinder, a spring-pressed tumbling blade carried by the cylinder, means for tumbling said blade, a roller carried by the blade, and a fixed trackway to engage said roller and depress the same to prevent its engagement with the disk.

15. In a machine of the character described, the combination with two supports for paper sections, a slotted disk disposed horizontally to receive paper sections successively from said supports, cylinders disposed below said disk, and feed rollers coöperating respectively with said cylinders, of a spring-pressed tumbling blade carried by each cylinder, rollers carried by said blades, and trackways in position to be engaged by said rollers to prevent engagement of the blades with adjacent cylinders and with said disk.

16. In a machine of the character described, the combination with a support for paper sections, of a revoluble cylinder mounted horizontally below said support, a feed roller coöperating with said cylinder, a revoluble slotted disk disposed between said cylinder and paper support, a longitudinally movable head disposed in said cylinder and movable past the periphery thereof, said head having a member provided with diagonal perforations, a movable carrier, diagonal needles carried by the carrier, means for reciprocating said head and carrier, and means for independently reciprocating the needle carrier.

17. In a machine of the character described, the combination with a support for paper sections, of a cylinder mounted below said support, a feed roller coöperating with said cylinder, a cranked shaft mounted in said cylinder, a blade carried by said shaft for directing paper sections between the cylinder and feed roller, a cross head carried by said shaft, pins on said cross head, rotating means to engage said rollers to tumble the blade, and a notched ring coöperating with said rotating devices and rollers.

In testimony whereof, I have signed this specification in the presence of two subscribing witnesses.

CLAUD D. CURRY.

Witnesses:
LAURA E. SMITH,
AXEL V. BEEKEN.